UNITED STATES PATENT OFFICE.

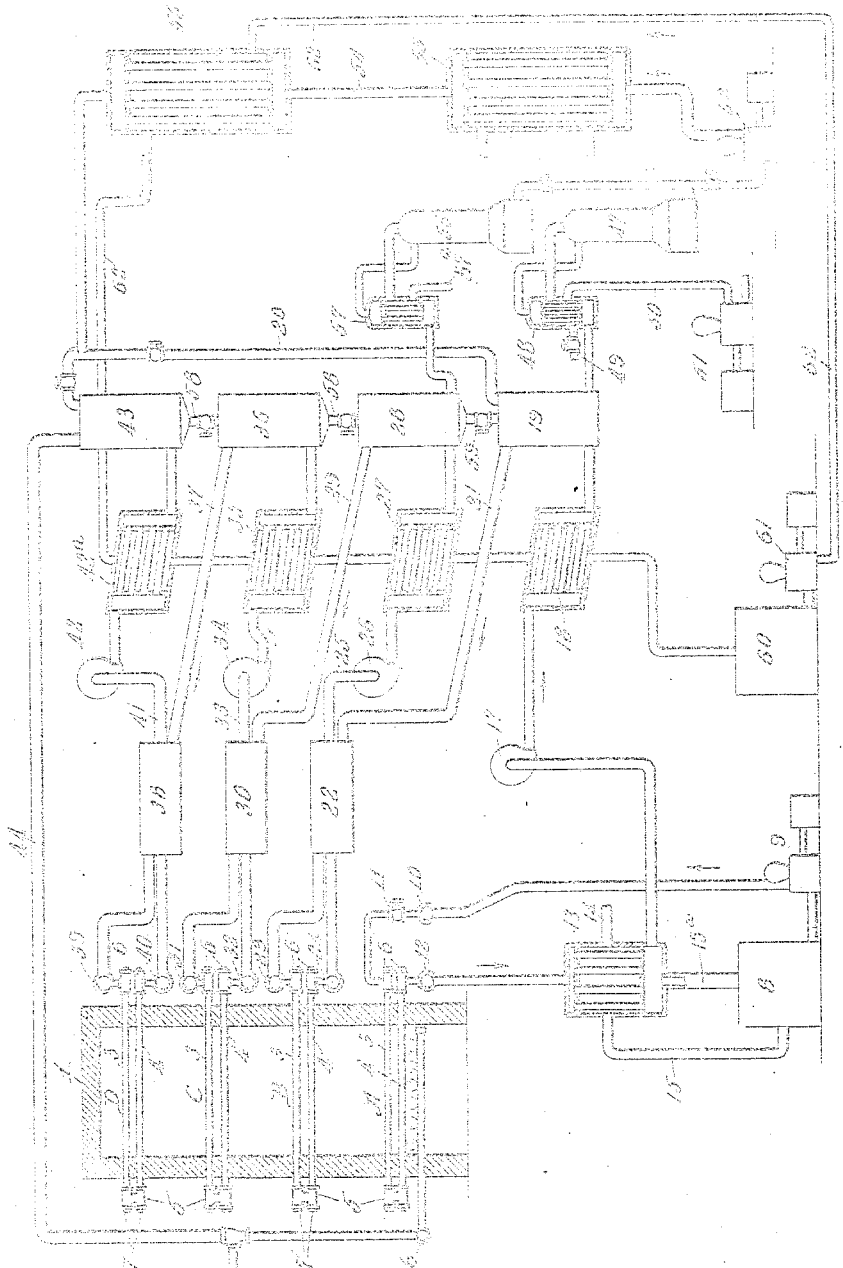

GAIL MERSEREAU, OF NEW YORK, N. Y., ASSIGNOR TO CHEMICAL DEVELOPMENT COMPANY, A CORPORATION OF MAINE.

PROCESS OF MAKING DIOLEFINS.

1,282,908.

Specification of Letters Patent.

Patented Oct. 29, 1918.

Application filed September 30, 1912. Serial No. 723,057.

*To all whom it may concern:*

Be it known that I, GAIL MERSEREAU, a citizen of the United States, residing at New York, in the county of New York and State of New York, have invented certain new and useful Improvements in Processes of Making Diolefins, of which the following is a specification.

This invention relates to processes of making diolefins; and it comprises a process of converting petroleum oils, advantageously heavy petroleum oils rich in or consisting of high-molecular hydrocarbons, such as heavy crude oils, gas oils, lubricating oils, paraffin oils, still residua, etc., into diolefins by exposure of oil vapors and gases therefrom to a regulated gas-making heat for a regulated time, such time being sufficiently prolonged for the formation of substantial proportions of diolefin vapors in the gas; as by passing currents of oil vapors and gases therefrom through relatively narrow tubes maintained at a gas-making heat, the temperature, the speed of transit of the current through such a tube and the heated length of tube being so correlated that a sufficient time of exposure to heat is afforded to produce a substantial proportion of diolefins in the gases; when such amount is so produced, removing the gases from the heated zone and cooling to arrest reactions, removing any condensable vapors from such gases and isolating and recovering diolefins from residual olefinic gases; such residual gases then, if desired, being exposed to as many repetitions of the heating and other treatments as will suffice to produce a desired total amount of diolefins; all as more fully hereinafter set forth and as claimed.

Diolefins, or "diethylenes," are doubly unsaturated hydrocarbons: substances having two double linkages between carbon atoms. They are highly reactive bodies which readily polymerize or condense under suitable circumstances to form materials of the nature of turpentine, caoutchouc, guttapercha, etc., and for this reason there is an active interest at present in their commercial production. Unfortunately none of the methods heretofore proposed has made possible their production at a cost sufficiently low to enable their use in the technical synthesis of the caoutchoucs.

While diolefins may be made from amyl alcohol, spirits of turpentine, various alcohols, amids, etc., these materials are all relatively costly, and the present processes of production are not only laborious and expensive but give low yields of diolefins. Most of the methods do not directly produce the diolefins as such but give compounds from which diolefins must be recovered; and generally the use of halogens, ordinarily bromin, is necessary in the operation. Bromin is relatively expensive while its atomic weight is high, necessitating the use of relatively large amounts in making relatively small amounts of diolefins.

It is an object of the present invention to make diolefins by a cheap, simple and ready method, using petroleum or petroleum products as a raw material and directly isolating and recovering the diolefins as such in lieu of as bromids or other compounds which must be subsequently decomposed to obtain the diolefins. Heavy petroleum oils, such as heavy crudes, gas oils, paraffin oils, lubricating oils, still residues, and the like are particularly suitable for my purpose since they consist mainly of hydrocarbons of comparatively high molecular weight which give me better results than low-boiling hydrocarbons; and are also cheaper. Even solid paraffins and petroleum waxes may be used. For my purposes, I find that oils boiling above, say, 150° C. and consisting mainly of oils having 10 to 20 or more carbon atoms in the molecule are best suited. Lower boiling oils are less suitable but may, in some instances, be utilized for my purposes. It is better to employ oils at least relatively free from cyclic or aromatic compounds which, under the conditions of my process, would give benzol, toluene, etc.; bodies which though valuable in themselves must be separated from the diolefins and which, in proportion to their amount, diminish the yield of diolefins. Under the conditions of the present process cyclic hydrocarbons are not formed *de novo* to any substantial extent. Gas oils and lubricating oils which are petroleum oils freed of low boiling constituents such as gasolene, kerosene and, in some cases, spindle oils, are particularly well adapted to my purposes. Spindle oils may be used.

I have found that by subjecting the petroleum oils to a high temperature and a gasifying cracking for a limited but appreciable time, diolefins are formed. The formation requires some time and is apparently due to secondary reactions in the gases. The temperature is best around a just visible red heat, say about 700° C.; and is best within 30 to 50° C. of that temperature on either side. The temperature which may be employed however varies with other circumstances; and with plenty of oil vapors, enough to insure that with the proper time of diolefin formation given there shall still be unchanged oil vapors and olefin gases in the sphere of reaction, the temperature may even be pushed up to a white heat. With a copious oil feed, I have made gas containing nearly 8 per cent. diolefins in a tube nearly white hot. But the gas carrying the diolefins and made at this high heat is not so well suited, after isolation and recovery of the diolefins, for the production of more diolefins in the manner hereinafter described. The high heat damages the gas carrying the diolefins. I find temperatures around 700° with 800° C. as a maximum and 600° C. as a minimum are best adapted to my purposes. The time factor is an important one since the diolefins are apparently formed by secondary reactions at the expense of the gases directly formed from the oil; and these secondary reactions require an appreciable time. Their velocity appears to follow however a descending curve. As a rule, the heating should be continued until the per cent. of diolefins in the gases ceases to increase rapidly and then the gases should be at once cooled to arrest further internal reactions. In passing the vapors and gases through a narrow hot tube, I find that with about 2 seconds exposure to heat I can secure a gas containing 4 to 5 per cent. of diolefins while by heating for 5 seconds, I can secure somewhat in excess of 8 per cent. I have obtained as high as 11 per cent. with 30 seconds exposure; but ordinarily I find, and particularly where the gas is to be used again to make more diolefins (as hereinafter described), it better to cease heating when the diolefins are around 8 per cent.

Expressed in terms of apparatus, I find that with a copious feed of heavy oil, enough to cause unchanged vapors to go past the heating zone, as little as 6 inches of travel through a narrow heated metal tube at about 700° C. will cause production of a substantial amount of diolefins, up to 4 or 5 per cent., in the resulting gas. There is however not a great amount of oil converted into gas in the time of exposure to the gasifying heat. This gas is, roughly, about half olefins (with a predominating amount of ethylene) and something less than half ethane. With 30 inches of travel, there is more gas formed, but the per cent. of diolefins in the gas does not increase materially, though the total amount of gas, and therefore of diolefins, is greater. With 90 inches of travel in a quarter to three quarter inch metal tubes however while the per cent. of olefins in the gas drops somewhat that of diolefins goes up; and a gas carrying between 8 and 9 per cent. diolefins may be thus made. With larger tubes, the actions are somewhat different though with uniform heating of the heated zone, a high per cent. of diolefins may be made, but I find it best to use narrow metal tubes, say between ½ and ¾ inch internal diameter. These tubes should be in straight lengths with end caps to enable ready cleaning by a cleaning rod. Contained catalysts and contact masses are not necessary for successful operation and their presence renders it hard to keep narrow tubes clean and unobstructed. Should hard coky carbon once form in the tubes, the regularity of operation is affected and the tubes quickly plug up, the carbon apparently acting as a catalytic to form more carbon. With such carbon forming the operation is therefore best interrupted at once to remove the carbon. With proper temperatures and care in operation the tube may go for weeks without cleaning.

As many tubes or tube retorts may be employed operating in parallel as may be desired; it being better to gain capacity in this way rather than by increasing the diameter of the tubes.

Ordinary steel or iron tubes are suitable, though bronze, brass, copper, aluminum, terracotta, quartz, etc., may be used.

The manner of introducing the oil into the tube is not a matter of indifference. While vapors may be generated in a special still and sent thence into the tube retorts it is better to introduce the oil as such with a sort of flooding feed. On the rapid supply of oil into the hot tube, a small amount of oil is so quickly vaporized that it disruptively atomizes the rest and carries the atomized material along the tube in a rapid current. It is not merely the low boiling portions that are so flashed into vapor, the vaporization taking place so rapidly that all the components of the affected portion of an oil drop are vaporized. This atomization results in carrying misted unchanged oil as such through a long space of the heated zone and thereby contributes materially to the uniformity of the results in the gasification. The use of small diameter tube retorts, such as quarter inch and half inch iron piping, aids materially in preserving the uniformity of admixture of oil and vapors thus obtained since there is no opportunity for stratification of the heavy oil and oil vapors and of the relatively light gas in such small bore tubes. Low boiling petroleum oils, aside from not giving as good results for other reasons, do not permit the described type of atomization.

Some crude oils on vaporization give a residue of carbon, this being apparently, at least in some cases, due to contained preformed colloidal free carbon. This is always small in amount and is not the type of hard coky carbon (formed by dissociation of methane or by catalytic action on other hydrocarbons) which is to be avoided in the present process and it occurs in a, comparatively, low temperature portion of the apparatus. It should nevertheless be removed from time to time. No substantial amount of either carbon or tar will form in the tube retorts as long as coky carbon is absent and the temperatures are maintained around 700° C. Small amounts of soft carbon, of the nature of lampblack or soot, do no harm.

When the proportion of diolefins in the gas formed in the tube ceases to increase rapidly, the gas and vapors should be removed from the heated zone and quickly cooled to arrest internal reactions and to remove vapors of condensable oils. The condensed material is returned to be mixed with fresh oil and used anew. Usually air cooling, with the heavy oils best used in the present invention, will suffice to take out most of the vapors since the condensing unchanged heavy oil acts as an efficient scrubbing means to remove vapors of low boiling bodies like the "cracked gasolenes," removing practically all condensable bodies present. However, water cooling or even some degree of refrigeration may be employed. The gas passing beyond the cooling means will now contain the desired diolefins together with olefins and saturated gaseous hydrocarbons. Operating as described, the amount of diolefins will be about 8 to 8.5 or 9 per cent. by volume of the gas.

To isolate the diolefins and recover them as such several expedients may be employed. One is to cool and compress the gas, thereby liquefying the diolefins which can be thus readily isolated from the residual ethylene, propylene, ethane, etc. It is however better because of the high vapor tension of the diolefins and the relatively dilute state in which they occur in the gas, to use some portion of chilled low-freezing oil as an absorbent. This oil may be used in connection with the compressing means. From this oil diolefins may be readily released by warming. The temperature of this oil may advantageously be as low as zero Fahrenheit. Low cold-test California gas oils, rich in aromatic constituents and free of volatile constituents are well adapted as they have good absorbent power for the diolefins. However other oily materials, and even such solids as paraffin wax, may be used.

A very advantageous method of operation in isolating the diolefins is to simply scrub the olefinic gas with chilled wash oil, advantageously around zero Fahrenheit in temperature, using apparatus on the counter-current principle and of the type of scrubber towers, column stills, etc. From the cold charged wash oil the diolefins may be released by warming. They may then be liquefied by compressing and chilling the vapors. Erythrene or divinyl is always a large component.

Other and chemical absorbents may be used in lieu of the chilled oil; but some do not permit the direct isolation and recovery of the diolefins as such. Sulfuric acid of suitable concentration and temperature may be employed to absorb the diolefins, allowing the olefins and other gases to go forward; and from the sulfuric acid solution so formed, polymerized useful products may be obtained by dilution. Solutions of mercuric salts may be used. The diolefins may be combined with sulfur dioxid either in a gaseous or dissolved state as these combinations are readily resolved by heating.

Chilled wash oil however I regard as the best means of recovering the diolefins since its use does not involve heavy pressures or dangerous chemicals and since it permits a ready isolation of the diolefins from the accompanying olefinic gases.

After the removal of the diolefins from the oil gas in any of the manners just described, there is left a residual gas rich in olefins and ethane. It may carry from 40 to 50 per cent. total olefins, 4 or 5 per cent. acetylenic hydrocarbons and a residue of ethane and other saturated gases.

This residual gas, as I have found, may be run back through another tube of the character of that in which it was formed with the production of another crop of diolefins. Here again ceasing the heating when about 8 per cent. of diolefins are formed seems to be a practical limit. While the proportion may be run up to 11 or 12 per cent. this damages the gas. On cooling and removal of the newly formed diolefins, a repetition of the heating may be used to give about the same per cent. of diolefins in the gas. A fourth heating generally gives a lower amount, say about 6 per cent.

With the stated yields, about a quarter of the original oil is converted into and recovered as diolefins. The gas remaining after the final diolefin production is still rich in heating and lighting value; and may be used for such purposes.

While the diolefins may be removed from the gas by the use of chlorin or bromin this is not advantageous since not only are these halogens relatively expensive but they attack and remove the olefins also, thus on the one hand necessitating the use of more reagent and on the other spoiling the gas for the production of more diolefins. If bromids or chlorids of the diolefins are desired it is better to make them from the diolefins isolated and recovered as described.

Good results by the present process have been obtained from Kansas, Oklahoma and Pennsylvania crude petroleums. Gas oils made from these oils have proved particularly satisfactory. Heavy gas oil from Texas crude, sold as "navy fuel oils" gave good results. All these oils with the described reheating of the gas and with apparatus of the type described will give a yield of total diolefins amounting to about a quarter their weight. The residue appears as gas of good quality for heating and lighting, there being no waste as carbon and tar. The gas may be used for enriching lean gases such as blue gas, water gas, producer gas, etc.

In the oil-treating step, the excess of oil going through the heated tube and afterward condensed is simply returned for repassage together with fresh oil. With tubes heated to around 700° C. and with heavy oils, about a quarter of the condensed material will be "cracked" oil, of the nature of gasolene, kerosene, etc., and the residue will be original oil. In the operation it is best to have an oil feed copious enough to insure at least 10 per cent. of the amount fed in going on past the heating zone and recoverable on cooling the emerging gas and vapor current. A larger amount, up to 30 per cent., is often desirable. This detail however depends somewhat on the nature of the heating apparatus. The more accurately and uniformly the heating operation can be conducted, the less is the need for large quantities of shielding oil going forward with the gases. By running the excess of heavy oil through and condensing it rather warm, it will not hold back diolefins. This warm condensation is of course not possible where the material used is low boiling oils.

Any desired heating means may be employed, such as electric heating, coal heating, oil heating, gas heating, etc. Anthracite coal gives a uniform type of heating which can be nicely regulated at about the range of temperature desired in the present invention. But as the process produces considerable residual gas, this may be conveniently used. It is however a gas of desirable character and may be replaced by a cheaper gas, such as producer gas.

In the reheating of the olefinic gas to produce successive crops of diolefins it is not necessary to have oil vapors in the sphere of reaction and their use introduces practical complications in the operation. Except in the original formation of the gas therefore I ordinarily do not heat in the presence of oil vapors. In the reheating, the temperatures may advantageously be, as in the original production of the gas, around 700° C.

In the original heating of the oil vapors, if desired a diluent gas may be used. This diluent gas may be residual gas from the diolefin production described, or it may be another gas of inert character such as nitrogen, producer gas, water gas, carbon monoxid, etc. Carbon dioxid and steam may be used, if desired, in some cases. The use of a diluent reduces the concentration of the diolefin vapors in the gas mass and therefore allows the production of a larger absolute amount. It is not ordinarily desirable in the specific embodiments of my invention herein described to use air or oxygen. Where oxidizing bodies are present in the sphere of reaction, the reactions are not of the simple type of thermolytic and thermosynthetic desired in the present invention. Such oxidizing bodies may be used but the reactions are of somewhat different type.

Diluent gases where used are more advantageous in the reheating of the gases than in the treatment of the original oil, as the oil vapors themselves form a diluent; and a diluent which is particularly convenient for the present purposes since it may be removed by simple cooling and condensation.

The pressure under which the operation is carried on may conveniently be the ordinary atmospheric pressure. Small increases or diminutions of pressure do not materially change the results and are not particularly advantageous.

In the accompanying illustration I have shown, more or less diagrammatically in vertical section, some parts being in elevation, a typical organization of apparatus elements within the present invention and useful in the operation of the described process. In this showing, Element 1 is a suitable furnace chamber. In this chamber are, as shown, four banks, A, B, C, and D, of tube retorts, the retorts of A serving to transform oil into gas containing olefins and diolefins and those of B, C, and D being reheaters, or diolefin generators. In each bank, there may be as many sets of tube retorts operating in parallel as may be desired. The tube retorts, as shown, in all the banks are similar and consist of a length 3 of narrow tubing from 0.25 to 1 inch internal diameter connected with another length or return tube 4 by vertical connection 5. Each length may have an extension of 40 or 50 inches within the furnace chamber. Caps 6 and 7 at the ends of each tube enable a cleaning rod to be thrust through.

Oil is supplied from reservoir 8 by means of pump 9 to main 10 which may feed any number of tube retorts operating in parallel in bank A. The connection between the main and each tube retort is valved at 11, permitting any individual tube retort to be cut out for cleaning without interrupting the operation of the others in the bank. The tube retorts are, as shown, best supplied with liquid oil or given a "flooding feed" as this is more convenient than the generation of oil vapors elsewhere with the heavy, high-boiling oils most advantageously used in the present invention. The gas formed in the tube retorts of bank A and the excess of oil vapors pass into main 12. Using heavy oils as raw material this may be simply air-cooled, but it gives an economy of space to use a surface condenser such as 13 of a well known type. This may be fed with oil through 14, the oil passing through and going to the reservoir through pipe 15. The condensate drains back through a conduit shown diagrammatically at 15ª into the reservoir where it mixes with the fresh oil and is returned for passage through the retorts in admixture with such oil. The condensed oil always contains some cracked products of the nature of gasolene and kerosene, but there is usually a larger proportion of unchanged original oil and the volatile cracked products are absorbed and held back by this oil; they are scrubbed out. The gas passing the condenser is urged by pumps or impellers 17, which may put it under as much pressure as may be desired, past chiller 18 into absorber 19. The chiller is best given a slight slant toward the absorber to facilitate drainage thereto. The absorber may be any ordinary type of scrubber or it may be constructed something like a column still with cups and plates to facilitate intimate contact of the gas with the cold oil supplied through inlet 20. The gas freed of its diolefins and quite cold passes through 21 to a heat interchanger 22 and thence to a gas main 23 supplying the tube retorts of bank B. In the tube retorts of this bank the gas is reheated and diolefins produced. The hot gas goes to main 24 and thence through the heat interchanger and conduit 25 past pump or impeller 26 and chiller 27 to absorber 28. Here it is once more treated with chilled oil to remove diolefins. After scrubbing it goes through conduit 29 and heat interchanger 30 to main 31 supplying the retorts of bank C. In this bank it is once more heated to produce more diolefins. It passes from bank C to main 32 and thence through the heat interchanger and conduit 33 past impeller 34 through chiller 35 to absorber 36. Here it gives up its new charge of diolefins to the chilled oil and is then sent through conduit 37 and heat exchanger 38 to main 39 supplying the tube retorts of bank D. From these retorts it passes to main 40, thence through conduit 41 and the heat interchanger past impeller 42 and chiller 42ª to and through absorber 43 to remove the diolefins.

The operation may be repeated, but in general after four heating operations the amount of olefins diminishes to such an extent that the production of diolefins becomes quite small and as a rule at this point the residual gas, which is still of a desirable mature for heating and lighting, is best used for such purposes. It may however be passed over a catalyst, such as nickel or palladium, or both together, on a carrier, such as petroleum coke, at about 200° C. to produce more olefins and then the described heating and absorbing operations repeated.

The gas passing the fourth absorber shown is still rich in ethane and other gases of high heating and lighting value. It may be sent through conduits 44 and 45 to any suitable place of use; or it may be treated as described. A portion may be sent through 46 to supply heat in the furnace.

The diolefins in the gas from retorts A are not usually as pure as those recovered from the reheated gas in later operations. The diolefin recovered in scrubbers 43 and 36 may be substantially pure divinyl (erythrene). In 19, some aromatic hydrocarbons may be taken up. The described gas-making operation does not form the aromatic hydrocarbons from the aliphatic but if the original oil contains such hydrocarbons they may reappear in the gas. For this reason it is usually worth while recovering the diolefins from 19 separately from those recovered later. For this purpose this absorber may be connected to a separate still 47 having a heat interchanger 48 acting as a "goose". In lieu however of sending condensates back into the still, as is usual with such an interchanger, they may be removed by outlet 49. This will dispose of most of the gasolenes or benzols which go forward. The uncondensed vapors pass out through pipe 50 to pump 51 where they are liquefied to form commercial diolefin, which may be packaged in drums.

The still may be run at a temperature of about 70° to 80° C. The wash oil from the still or releaser (47) passes by pump 52 to and through cooler 53, where it may be cooled by water and thence by conduit 54 to chiller 55 where its temperature may be lowered to about —15° C. by circulating brine or calcium chlorid solution. Thence it passes to and through the series of absorbers. A special valved pipe (20) may lead a portion to the first absorber (19) in the series to enable its independent operation. When this independent operation of the absorber operating on the original oil gas is desired, a special still 56, provided with heat interchanger or "goose" 57, of ordinary construction, may be used. Vapors from this may be passed through outlet 57ª to a liquefying pump (not shown) to produce diolefins rich in divinyl. The chilled oil passes from one absorber to another, taking up diolefins as it goes, the connection between the absorbers being designated 58. A special valved connection 59 enables the absorber for reheated gas and the absorber (19) for oil gas to be used together.

In this event, the still just described (56) is not used. Brine or calcium chlorid may be chilled in refrigerator 60 and sent by pump 61 and conduit 62 through the oil chiller (55) and the successive gas chillers back to the refrigerator.

It is a useful expedient in promoting uniformity in the gases within the tubes and preventing stratification, to give the tubes a twist or "rifle" thereby causing a whirling motion in the current passing through a tube.

The diolefins recovered in the described operations may be fractionated to produce pure erythrene, isoprene, piperylene, etc., or the mixture may be used directly for making mixed caoutchoucs, etc. The diolefins produced in the oil-gas making operation if containing light cracked gasolenes, benzol, etc., may of course be separated from these impurities by fractionation.

What I claim is:—

1. In the manufacture of diolefins, the process which comprises removing diolefins from a gas containing olefins, diolefins and saturated hydrocarbon gases, while leaving most of the other gases therein, and heating the remaining gas under such regulated conditions as to produce a further quantity of diolefins and a concomitant reduction of the olefins present.

2. In the manufacture of diolefins, the process which comprises heating oil under such regulated conditions as to produce a gas rich in olefins and diolefins and comprising a notable quantity of saturated hydrocarbon gas, removing the diolefins, and reheating the remaining gas under such regulated conditions as to produce a further quantity of diolefins and a concomitant reduction of the olefins present.

3. In the manufacture of diolefins, the process which comprises heating oil vapors in transit to a temperature around 700° C. till the quantity of diolefins produced ceases to increase rapidly, removing residual oil vapors from the gas produced, removing diolefins while leaving the principal part of the olefins in the gas, and then reheating the remaining gas under such regulated conditions as to produce further quantity of diolefins.

4. In the treatment of gases rich in unsaturated hydrocarbons including in part diolefins and in part other unsaturated hydrocarbons, the process which comprises freeing such a gas of diolefins while leaving a large part of the other unsaturated hydrocarbons and reheating the remaining gas under such regulated conditions as to produce a further quantity of diolefins and a concomitant reduction of other unsaturated hydrocarbons present.

5. In the treatment of gases rich in unsaturated hydrocarbons, including in part diolefins and in part other unsaturated hydrocarbons, the process which comprises freeing such a gas of diolefins while leaving in it a large part of the other unsaturated hydrocarbons, and reheating the remaining gas under such regulated conditions as to produce a further quantity of diolefins and a concomitant reduction of the other unsaturated hydrocarbons present, these operations being repeated until substantial quantities of diolefins are no longer formed.

6. The process of producing diolefins which comprises submitting gas oil to a temperature around 700° C. to produce various hydrocarbon gases till the quantity of diolefins in the gas produced becomes substantial, cooling to remove residual oil, removing the diolefins while leaving most of the other hydrocarbons in the gas and reheating the remaining gas to produce a further quantity of diolefins.

7. The process of producing diolefins which comprises passing gas oil vapors through a hot narrow tube till the quantity of diolefins in the gas produced approximates 8 per cent., cooling to remove residual oil, removing the diolefins and reheating the remaining gas to produce a further quantity of diolefins.

8. The process of producing diolefins which comprises passing the vapors of a heavy petroleum oil through a hot narrow tube till the quantity of diolefins in the gas produced approximates 8 per cent., cooling to remove residual oil, removing the diolefins and reheating the remaining gas to produce a further quantity of diolefins.

9. In the production of diolefins, the process which comprises producing gas rich in diolefins from petroleum oil, removing such diolefins in the form of diolefins, and heating the remaining gas to produce a further quantity of diolefins.

10. In the production of diolefins, the process which comprises producing gas rich in diolefins from petroleum oil, removing such diolefins in the form of diolefins, and heating the remaining gas to a temperature around 700° C. to produce a further quantity of diolefins.

11. In the manufacture of diolefins, the process which comprises producing an oil gas rich in diolefins, removing condensable oils therefrom, scrubbing with chilled oil to remove diolefins, heating the remaining gas to produce a further quantity of diolefins and repeating the scrubbing with chilled oil to recover such further quantity.

12. The process of making diolefins which comprises subjecting gas containing olefins and other hydrocarbons to repeated passages through a hot tube with the temperature adjusted to produce diolefins and concomitantly reduce the olefins, the diolefins produced in each such passage being removed prior to a repassage, most of the other hydrocarbons remaining in the gas.

13. The process of making diolefins which comprises subjecting gas containing olefins and other hydrocarbons to repeated passages through a hot tube with the temperature adjusted to produce diolefins and concomitantly reduce the olefins, the diolefins produced in each such passage being removed prior to a repassage, most of the other hydrocarbons remaining in the gas.

14. In the manufacture of diolefins, the process which comprises forming an oil gas rich in diolefins, removing residual condensable vapors therefrom, recovering diolefins, heating the remaining gas to produce a further quantity of diolefins and recovering such further quantity of diolefins, the two portions of diolefins being recovered as separate quantities.

15. In the manufacture of diolefins, the process which comprises producing an oil gas containing gaseous olefins and diolefins and removing the diolefins from the gaseous olefins.

16. The process of making diolefins from petroleum oils which comprises vaporizing a mixture of fresh oil and once-treated oil, passing the vapors in contact with a surface heated to a low gas-making temperature until a substantial proportion of diolefins in the gas is formed, cooling the gas to recover residual oil for return to the original mixture, and removing the diolefins from the gas.

17. The process of producing diolefins which comprises producing petroleum vapors from a mass of petroleum material, exposing such vapors to a temperature sufficient to produce gas therefrom, continuing such exposure until the proportion of diolefins in such gas ceases to increase rapidly and removing diolefins from the gas.

18. The process of producing diolefins which comprises passing petroleum vapors through a narrow heated tube of such length that gases emerging therefrom no longer show a rapid increase in the proportion of diolefins on further heating, and recovering diolefins in the form of diolefins from such gas.

19. The process of producing diolefins which comprises producing vapors from a body of petroleum material, passing such vapors in contact with a heated surface till the proportion of diolefins in the gas produced ceases to increase rapidly, cooling the gas to remove residual oil and returning such oil to said body for retreatment, and removing diolefins from the cooled gas.

20. In the manufacture of diolefins, the process which comprises maintaining vapors of a petroleum in contact with a surface heated to a gas making temperature for a time insufficient to convert all of said vapors into gas but until the proportion of diolefins in the gas ceases to increase rapidly, removing the gas from contact with said surface, cooling to remove oil vapors and subsequently removing the diolefin vapors from the gas.

In testimony whereof, I affix my signature in the presence of two subscribing witnesses.

GAIL MERSEREAU.

Witnesses:
JOHN H. SIGGERS,
K. P. MCELROY.